(12) United States Patent
Sarfati et al.

(10) Patent No.: US 7,353,386 B2
(45) Date of Patent: Apr. 1, 2008

(54) METHOD AND DEVICE FOR AUTHENTICATING DIGITAL DATA BY MEANS OF AN AUTHENTICATION EXTENSION MODULE

(75) Inventors: Jean-Claude Sarfati, Boulogne-Billancourt (FR); Hervé Chau, Boulogne-Billancourt (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 594 days.

(21) Appl. No.: 10/875,529

(22) Filed: Jun. 25, 2004

(65) Prior Publication Data

US 2005/0125659 A1   Jun. 9, 2005

(30) Foreign Application Priority Data

Jul. 2, 2003   (EP)   ................... 03291625

(51) Int. Cl.
    *H04L 9/00*   (2006.01)
(52) U.S. Cl. .................... 713/161; 713/181
(58) Field of Classification Search ............. 713/161, 713/181
    See application file for complete search history.

(56) References Cited

U.S. PATENT DOCUMENTS

| | | | | |
|---|---|---|---|---|
| 5,787,172 A * | 7/1998 | Arnold | ................ | 713/175 |
| 6,009,176 A * | 12/1999 | Gennaro et al. | ............ | 713/170 |
| 6,061,449 A * | 5/2000 | Candelore et al. | ............ | 380/28 |
| 6,367,013 B1 * | 4/2002 | Bisbee et al. | ............... | 713/178 |
| 6,769,060 B1 * | 7/2004 | Dent et al. | ................... | 713/168 |
| 6,918,036 B1 * | 7/2005 | Drews | ........................ | 713/176 |
| 7,055,029 B2 * | 5/2006 | Collins et al. | .............. | 713/161 |
| 7,069,318 B2 * | 6/2006 | Burbeck et al. | ............ | 709/224 |
| 7,174,452 B2 * | 2/2007 | Carr | .......................... | 713/151 |
| 7,203,753 B2 * | 4/2007 | Yeager et al. | ............... | 709/225 |
| 7,213,047 B2 * | 5/2007 | Yeager et al. | ............... | 709/202 |
| 7,216,230 B2 * | 5/2007 | Suzuki et al. | ............... | 713/170 |
| 7,222,187 B2 * | 5/2007 | Yeager et al. | ............... | 709/237 |

(Continued)

FOREIGN PATENT DOCUMENTS

EP   0 752 786 A1   1/1997

(Continued)

OTHER PUBLICATIONS

Samar, "Unified Login with Pluggable Authentication Modules (PAM)," 3rd ACM Conference on Computer and Communications Security, New Delhi, Mar. 14-16, 1996; ACM Conference on Computer and Communications Security, New York, ACM, US, vol. Conf. 3, Mar. 14, 1996, pp. 1-10, XP00620972, ISBN: 0-89791-829-0.

*Primary Examiner*—Nasser Moazzami
*Assistant Examiner*—David Garcia Cervetti
(74) *Attorney, Agent, or Firm*—Osha Liang LLP

(57) ABSTRACT

An authentication method provides a segment forming an executable authentication plug-in previously authenticated by at least one authentication function from an authentication library and linked to a plurality of segments in accordance with a chaining relationship. In response to a request for authentication of a plurality of segments chained in accordance with the chaining relationship in this way, the method authenticates each successive segment and, in the case of a segment requiring the authentication plug-in, it executes the authentication plug-in in order to authenticate the segment submitted in this way to the authentication plug-in.

10 Claims, 4 Drawing Sheets

U.S. PATENT DOCUMENTS

| | | | |
|---|---|---|---|
| 2002/0138582 A1* | 9/2002 | Chandra et al. | 709/206 |
| 2002/0141593 A1* | 10/2002 | Kurn et al. | 380/286 |
| 2003/0033524 A1* | 2/2003 | Tran et al. | 713/168 |
| 2003/0200184 A1* | 10/2003 | Dominguez et al. | 705/78 |
| 2003/0217139 A1* | 11/2003 | Burbeck et al. | 709/224 |
| 2004/0010715 A1* | 1/2004 | Winiger et al. | 713/201 |
| 2004/0148334 A1* | 7/2004 | Arellano et al. | 709/201 |
| 2004/0216150 A1* | 10/2004 | Scheifler et al. | 719/330 |
| 2004/0261069 A1* | 12/2004 | Verbeke et al. | 717/166 |

FOREIGN PATENT DOCUMENTS

| | | |
|---|---|---|
| FR | 2 797 548 | 2/2001 |

* cited by examiner

METHOD AND DEVICE FOR AUTHENTICATING DIGITAL DATA BY MEANS OF AN AUTHENTICATION EXTENSION MODULE

BACKGROUND OF THE INVENTION

1. Field of the Invention

The present invention relates to the authentication of digital data by an authentication plug-in.

It finds a general application in the authentication of digital data distributed between a plurality of data segments linked to each other in accordance with a selected chaining relationship, in particular segmented digital data files.

It finds a particular application in the authentication of built-in software, for example built-in software in digital television receiver/decoder devices.

2. Description of the Prior Art

Built-in systems such as digital television receiver/decoder devices that require authentication of the software stored in memory in order to combat piracy are known in the art.

In practice, the authentication process uses an authentication library stored in non-rewritable memory and containing predetermined authentication functions.

For example, the authentication library contains signature calculation functions, decryption functions, public decryption keys and functions for verifying that the calculated signature conforms to an encrypted reference signature.

In practice, the encrypted reference signature forms a certificate that is placed in a rewritable and erasable portion of the memory of the receiver/decoder device.

The encrypted reference signature forming the certificate provides some degree of security. However, the use of a single certificate is a problem if the software to be authenticated is made up of a plurality of modules developed by different companies and managing access control, interactivity or other services, for example.

This is because only the holder of the private key is able to encrypt the reference signature, i.e. one of the elements for verifying the authenticity of the certificate.

This leads to conflicts of interest which may in turn lead to blocking that is a problem for the operator of the receiver/decoder device.

Moreover, the authentication library being held in non-rewritable memory, it is not possible to modify the authentication mechanisms on receiver/decoder device platforms that have already been deployed.

The present invention provides a solution to the above problems.

SUMMARY OF THE INVENTION

It provides a method of authenticating digital data distributed between a plurality of data segments linked to each other in accordance with a chosen chaining relationship, each data segment being associated with an authentication signature.

According to a general definition of the invention, the method comprises the following steps:

authenticating the plurality of segments in accordance with a chosen authentication algorithm, adapted to calculate a signature value for each successive segment in a chained and iterative manner and to compare the value of the signature calculated in this way with the associated signature, the next segment being authenticated in the event of a positive result on comparing the current segment and the first segment being authenticated on the basis of at least one function from an authentication library contained in non-rewritable memory, providing at least one segment forming an executable authentication plug-in stored in rewritable memory previously authenticated by at least one authentication function from the authentication library and linked to said plurality of segments in accordance with the chaining relationship, and in response to a request for authentication of a plurality of segments chained in this way, authenticating each successive segment and, in the case of a segment requiring the authentication plug-in, executing said authentication plug-in in order to authenticate the segment submitted in this way to the authentication plug-in.

Thus the authentication plug-in is used to add specific functions that are not provided at the outset for authenticating segments of software without modifying the authentication library contained in non-rewritable memory.

In one embodiment, each segment is associated with a data table containing an associated authentication signature, start and end addresses localizing the segment, start and end indicators localizing the associated signature, an indicator indicating that the segment is of the authentication plug-in type, and a designation identifying an authentication plug-in algorithm.

For example, the plurality of data segments is a result of segmenting a data file.

For example, the chaining relationship is such that the signature of the current segment contains the identifier of the signature of the next segment.

The present invention also provides a device for authenticating digital data distributed between a plurality of digital data segments linked to each other in accordance with a chosen chaining relationship, each data segment being associated with a predetermined authentication signature.

According to another aspect of the invention the authentication device comprises:

authentication means adapted to authenticate the plurality of segments in accordance with a chosen authentication algorithm and adapted to calculate a signature value for each successive segment in a chained and iterative manner and to compare the value of the signature calculated in this way with the associated signature, the next segment being authenticated in the event of a positive result for comparing the current segment, and the first segment being authenticated on the basis of at least one function from an authentication library contained in non-rewritable memory;

processing means adapted to provide at least one executable authentication plug-in segment stored in rewritable memory previously authenticated by at least one authentication function from the authentication library and linked to said plurality of segments in accordance with the chaining relationship; and processing means adapted in response to a request for authentication of a plurality of segments chained in accordance with the chaining relationship in this way to authenticate each successive segment and in the case of a segment requiring the authentication plug-in to execute said authentication plug-in in order to authenticate the segment submitted in this way to the authentication plug-in.

In one embodiment each segment is associated with a data table comprising an associated authentication signature, start and end addresses localizing the segment, start and end indicators localizing the associated signature, an indicator indicating that the segment is of the authentication plug-in type, and a designation identifying an authentication extension algorithm.

In practice the plurality of data segments is the result of segmenting a data file.

The chaining relationship is preferably such that the signature of the current segment contains the identifier of the signature of the next segment.

The present invention also provides an information medium readable by a data processing system and optionally partially or totally removable, in particular a CD ROM, a magnetic medium such as a hard disk or a diskette, or a transmissible medium such as an electrical or optical signal.

According to another important feature of the invention the information medium contains instructions of a computer program for executing the above authentication method when the program is loaded into and executed by a data processing system.

The present invention further provides a computer program stored on an information medium, said program containing instructions for executing the method referred to hereinabove when the program is loaded into and executed by a data processing system.

Other features and advantages of the invention will become apparent in the light of the following detailed description and the drawings.

DETAILED DESCRIPTION OF THE PREFERRED EMBODIMENT

Figure 1:
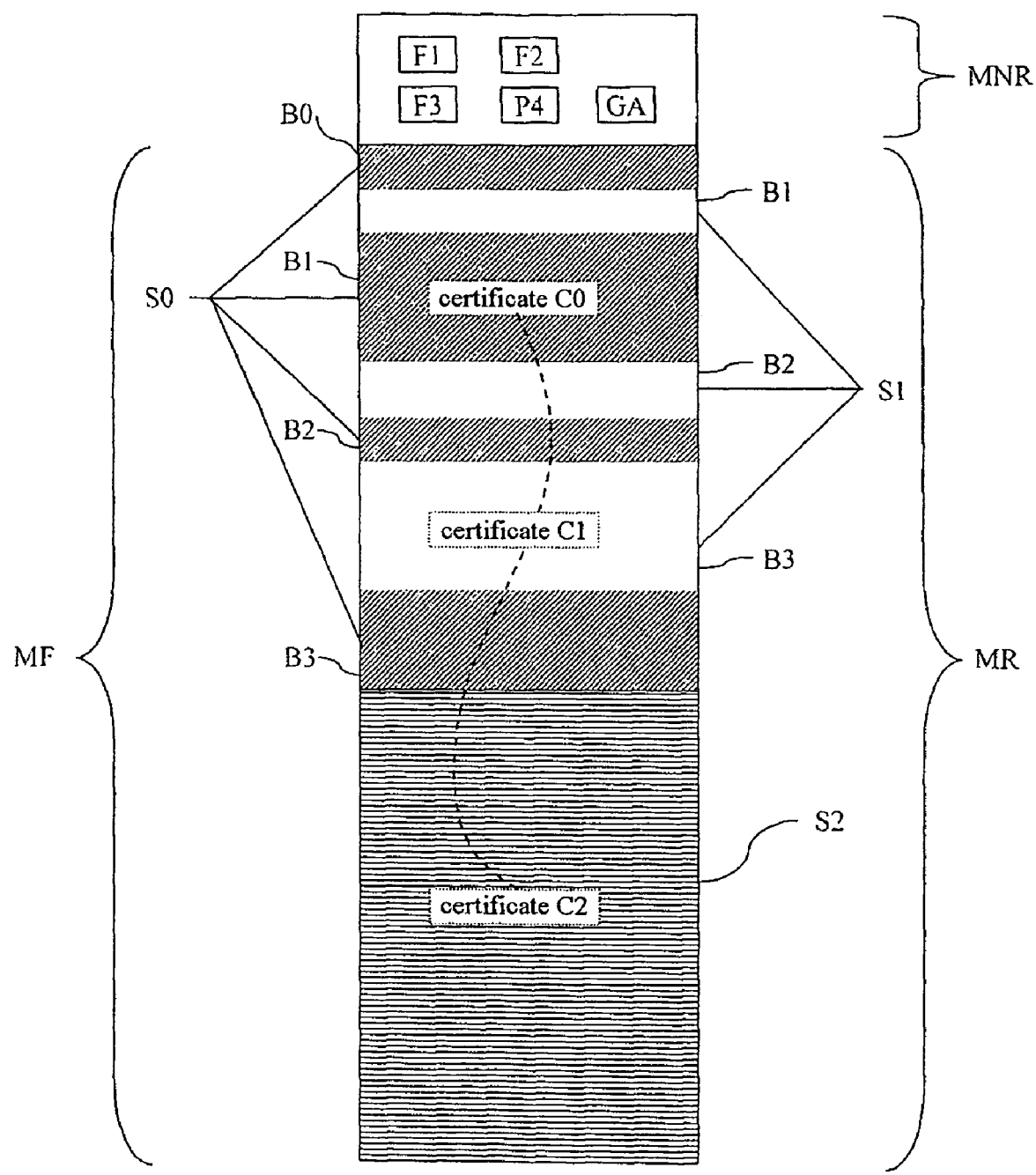
FIG. 1 is a diagram representing a memory of a receiver/decoder device whose non-rewritable area contains an authentication library and whose rewritable portion contains a plurality of segments linked to each other in accordance with a selected chaining relationship according to the invention.

FIG. 1 represents a flash memory MF of a digital television receiver/decoder device.

The receiver/decoder device executes software whose authenticity must be verified to prevent piracy.

The flash memory MF has a non-rewritable area MNR and a rewritable area MR.

The software to be authenticated is divided into i segments S with which are associated i certificates C. Each segment Sk is divided into blocks Bj that are not necessarily contiguous.

The segments S are linked to each other in accordance with a chosen chaining relationship.

In practice, the chaining relationship is such that each certificate Ck contains the identifier of the next certificate Ck+1.

Each certificate Ck contains in encrypted form the signature of the segment Sk to which it relates. The certificate Ck is followed by the list of the blocks B constituting the segment Sk.

The first block B0 of the first segment S0 describes the certificate C0 itself.

The certificate Ck is generally an authentication signature encrypted using a private key.

The private key used for each certificate Ck may be different from one certificate to another.

It is therefore possible to assign a private key to each company involved in the production of software to enable it to authenticate the segment(s) S that contain the software modules to be authenticated.

The non-rewritable area MNR may store in a memory page an authentication library containing functions F1 to F4 and an authentication manager GA described in more detail later.

The public keys corresponding to the private keys are contained in the authentication library.

The number of public keys is limited to three, for example.

authentication library contains four functions F, individually denoted F1 to F4, for example.

The first function F1, "init_digest", is an initialization function adapted to initialize the signature calculations.

The function F1 is invoked for each new segment Sk signaled by a certificate Ck. The function F1 is used to effect the initialization necessary for the signature calculation.

The second function F2, "calc_digest", is a block calculation function that is invoked for each block described in order to accumulate the calculation of signatures of the segment.

The third function F3, "end_digest", is a segment calculation function that is invoked after the cumulative signature calculation of the last block to finalize the calculation of the signature of the segment.

Finally, the fourth function F4, "verif_digest", is a verification function that verifies that the calculated signature conforms to the expected signature for the segment concerned.

To this end, the verification function F4 decrypts the certificate Ck and compares the certificate received in this way with the calculated result. In practice, the public key to be used is indicated in the certificate Ck. The calculated signature and the certificate are passed to the verification function F4 as input parameters. The verification function F4 may also have an input parameter in the form of a number, for example the serial number of the terminal on which the software to be authenticated is installed.

The verification function F4 delivers an output signal that may take the following values:
 "OK", meaning segment correctly authenticated;
 "KO", meaning segment not authenticated;
 "VOID", meaning a segment consisting of a certificate, described more fully later;
 "DONE", meaning that all the elements have been authenticated successfully.

As soon as a segment S is declared "KO", then all the other segments proposed are also declared "KO".

In practice, the authentication method comprises the following steps:
 i) searching for the first certificate C0 whose identifier is equal to zero;
 ii) authenticating the associated segment S0;
 iii) invoking the initialization function F1 and carrying out the signature calculations according to the function F2 "calc_digest";
 iv) invoking the end of signature calculation function F3 "init_digest";
 v) invoking the verification function F4 "verif_digest".

Steps iii) to v) are repeated for each certificate Ck linked to each other by the chaining relationship mentioned above, as far as the last certificate Ck=i.

In practice, the request for authentication of the certificates C emanates from software, for example software from the manufacturer of the receiver/decoder device that performs the operations of searching for the certificates and which then presents the blocks to be authenticated to the functions F1 to F4 of the authentication library, in accordance with the chosen chaining relationship.

Thus authentication is carried out in an order imposed by the chaining of the certificates.

To be authenticated by the authentication library, software must contain at least one certificate. Moreover, the whole of the erasable or rewritable portion MR of the memory must be verified.

Thus the first certificate C0 of the chain contains the size of the erasable portion MR of the flash memory MF to enable the library to verify the end of processing of the last segment, which in practice may be marked by the last certificate Ck=i of the chain. Thus it is possible to determine that the whole of the flash memory has been verified.

Figure 2:
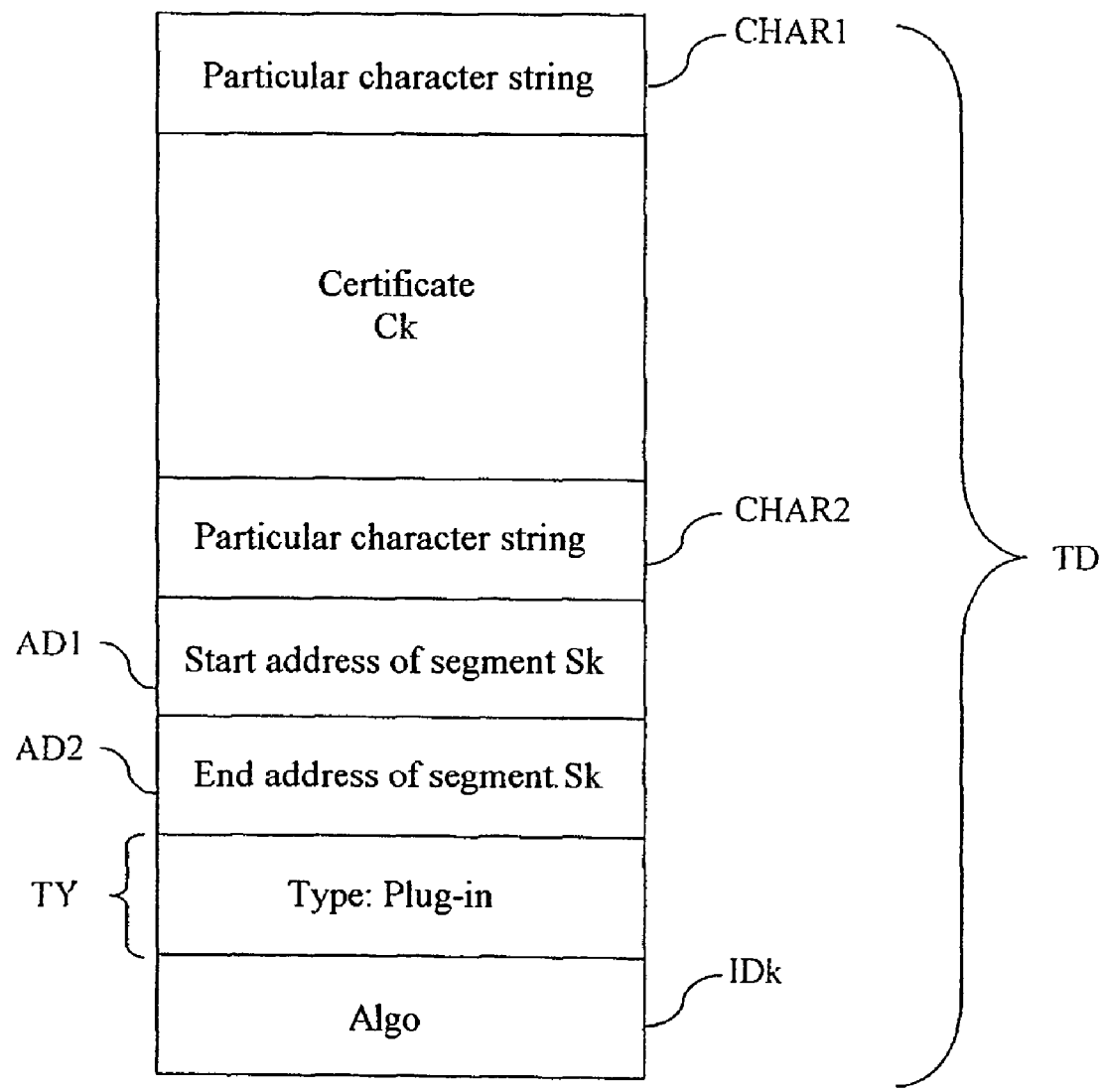
FIG. 2 represents a data table associated with each segment according to the invention.

Referring to FIG. 2, each segment Sk is associated with a data table TD containing information for executing the method according to the invention.

Firstly, the table TD contains the signature Ck associated with the segment Sk. Start and end indicators CHAR1 and CHAR2 localize the signature C. The indications CHAR1 and CHAR2 are of the character string type, for example.

Secondly, the table TD contains the segment Sk. Start and end indicators AD1 and AD2 locate the associated segment S. The indicators AD1 and AD2 are of the address type, for example.

Thirdly, the table TD contains an indicator TY indicating that the segment Sk is of the authentication plug-in (MEA) type.

Fourthly, and finally, the table TD contains a designation ID identifying a dedicated authentication algorithm or an authentication algorithm attached to the authentication plug-in MEA.

In practice, the identifier ID of the algorithm identifies the authentication algorithm to be used by the authentication plug-in. The algorithm to be used may be the authentication manager GA of the authentication library and/or an authentication plug-in ("plug-in") MEA described in more detail later.

Figure 3:
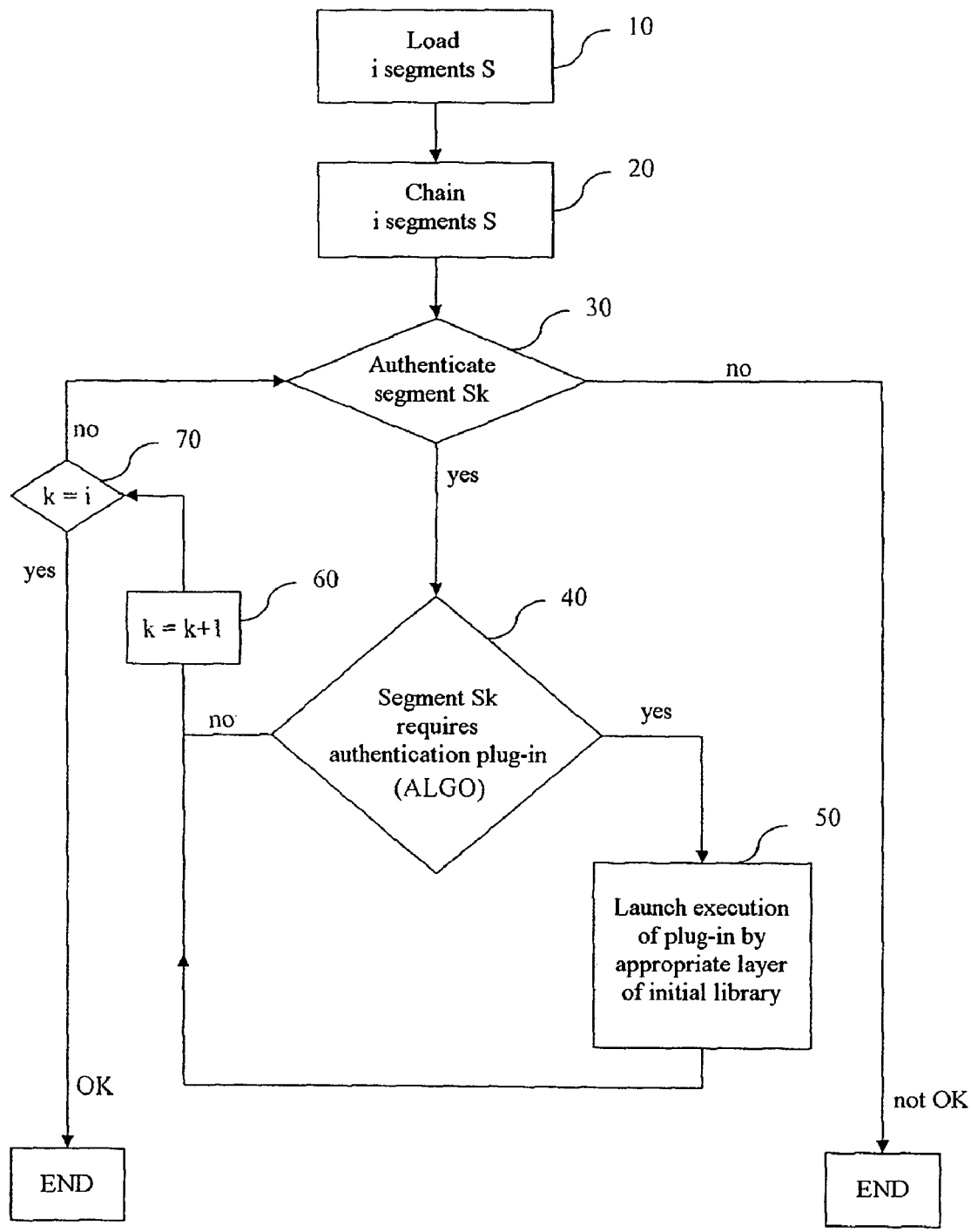
FIG. 3 is a diagram representing a flowchart depicting the steps of the authentication method of the invention.

FIG. 3 shows the essential steps of the authentication method according to the invention.

Step 10 covers the loading of the i segments S to be processed by the authentication device according to the invention.

In practice, it is the authentication manager GA that scans the file to be authenticated and detects the areas containing the segments and certificates to be processed from the indicators CHAR1, CHAR2, AD1 and AD2.

Step 20 verifies the chaining of the i segments S in accordance with the chosen chaining relationship.

Step 30 authenticates the plurality of segments S successively and iteratively, here the segment Sk.

The authentication manager GA executes the authentication algorithm according to the invention and, in response to a segment Sk indicating that it is necessary to use the authentication plug-in MEA (step 40), said authentication manager launches the modification plug-in (step 50) to authenticate the segment Sk to be processed by said authentication plug-in MEA.

After execution of the authentication plug-in MEA (step 60), the process moves on to the next segment Sk=k+1 and the authentication loop is repeated up to the last segment Sk=1 (step 70).

In practice, when it launches the authentication plug-in MEA, the authentication manager GA gives said authentication plug-in the processing parameters enabling it to authenticate the segment to be processed. These parameters include in particular the start and end addresses AD1 and AD2 of the segment to be authenticated.

Prior to authentication of the segment by the authentication plug-in MEA, it is necessary to authenticate said authentication plug-in.

For this purpose, if the certificate Ck contains an authentication plug-in type indicator TY, then the authentication manager authenticates said authentication plug-in by means of the functions F1 to F4 of the authentication library. The authentication manager then stores the identifier ID of the authentication plug-in MEA authenticated in this way in the data table TD mentioned above. The identifier ID corresponds in fact to the number of the algorithm to be used by the authentication plug-in.

The authentication plug-in is then used subsequently in response to solicitation by the authentication manager to authenticate a segment for which the certificate indicates an affirmation TY="algo" corresponding to the algorithm number of the authentication plug-in.

Thus the authentication plug-in is executed as an authentication function for authenticating a segment, instead of using the functions in the authentication library, the authentication plug-in having been authenticated beforehand by the authentication library.

Figure 4:
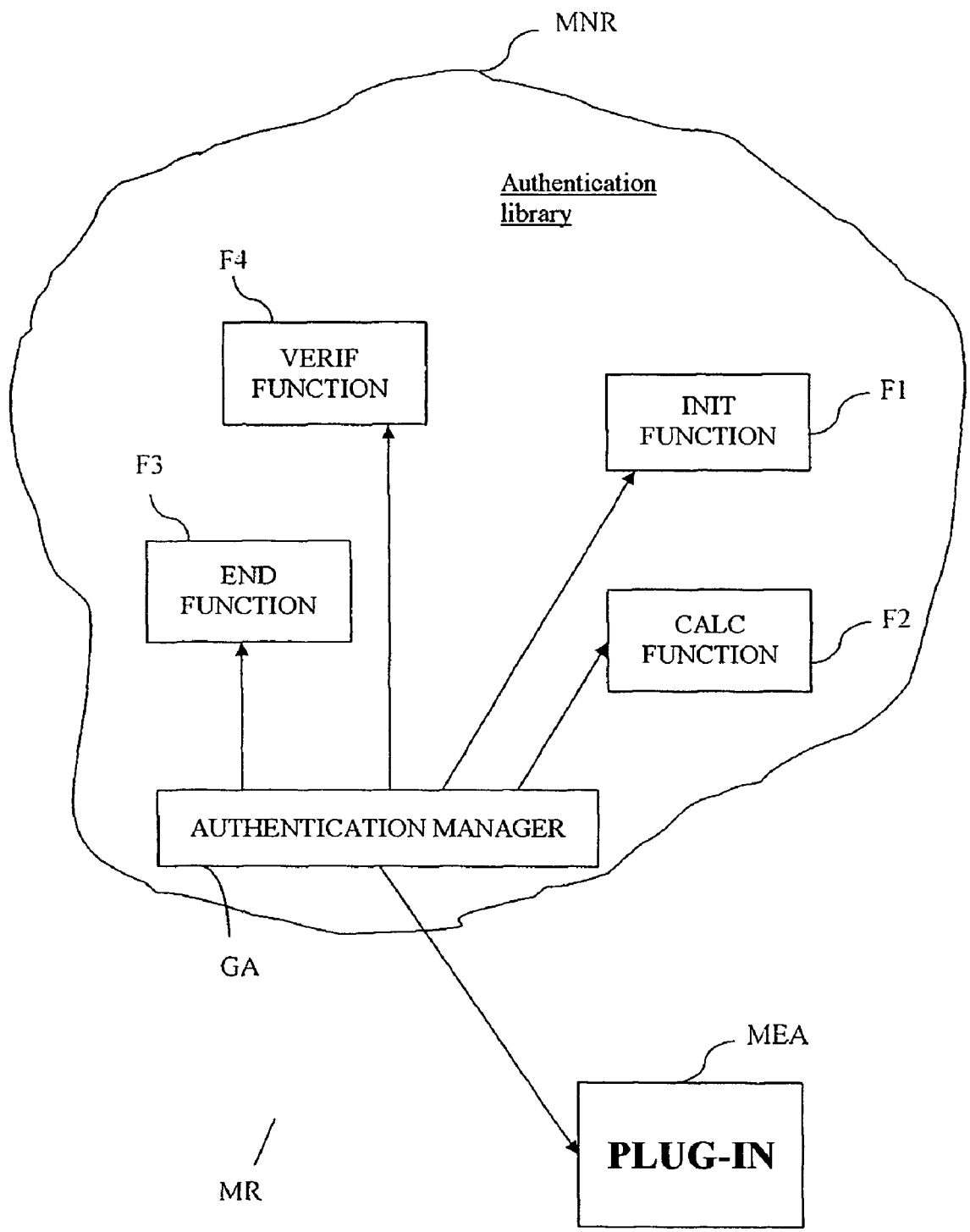
FIG. 4 is a diagram representing the interaction between the authentication library and the authentication plug-in according to the invention.

Referring to FIG. 4, the authentication manager GA interacts with the functions F1 to F4 of the authentication library in the non-rewritable memory MNR and with the authentication plug-in MEA in the rewritable memory MR.

The authentication plug-in MEA comprises an interface receiving by way of input parameters the parameters used by the authentication library and a parameter TY indicating the type of the function to be executed, namely one of the four functions F1 to F4.

On exit, the verification function F4 of the authentication module MEA returns the following information:
"KO" indicating authentication of the segment submitted to the authentication plug-in MEA;
"VOID" indicating that the authentication plug-in has detected a "VOID" certificate submitted in this way to the authentication plug-in MEA; and
"DONE" indicating the end of the authentication process.

In practice, the authentication plug-in MEA to be used for a non-executable segment is indicated by the algorithm number TY indicated in the associated certificate.

If the authentication plug-in MEA has not been authenticated beforehand by the authentication library, then the authentication plug-in is not executed and the verification function F4 "verif_digest" returns a "KO" type indication.

Authentication in accordance with the invention based on an authentication plug-in finds many applications.

For example, authentication based on an authentication plug-in finds an application in the authentication of segments containing "padding" elements.

For example, these padding segments are filled with a fixed value on one, two or four bytes. Thus, according to the invention, instead of using a condensation or hashing algorithm, having drawbacks in terms of processing time, there is created in accordance with the invention an executable authentication plug-in MEA type segment with information relating to the authentication algorithm to be installed. Thus the authentication plug-in uses a simple comparison loop to verify that the segment to be processed is filled with a fixed value.

In this case, the certificate linked to the padding segment containing a fixed value carries the value of a corresponding algorithm number, for example "algo2". The authentication library uses the code contained in the executable segment relating to the algorithm "algo2" to authenticate the padding segment.

The method according to the invention also limits the authentication of segmented software to the authentication of a single segment.

If the result of authenticating the single segment is negative, then the result for the software as a whole is negative, whereas if that authentication result is positive, the remainder of the software has not been authenticated.

One application may correspond to the authentication of a list of decoders contained in the segment to be authenticated.

The calculation functions F1 to F3 and the verification function F4 then authenticate the segment containing the list in the conventional way, and the verification function F4 checks that the serial number passed to it as a parameter is in the list. If so, the function F4 returns the value "DONE". On the other hand, if the terminal is not in the list, the function F4 returns the value "KO".

In practice, the authentication plug-in MEA increments the initial functions provided in the authentication library, in particular allowing the creation of downloadable authentication plug-ins that force failure of the authentication for a list of required decoders, the addition of public keys, etc.

Thus the authentication plug-in secures the downloading of software onto a platform. By identifying the downloaded software on reception, it is possible by means of the authentication method according to the invention to verify the integrity of the downloaded software, that it is not contaminated, or more generally that it has not been intentionally modified with a malicious objective.

What is claimed is:

1. A method of authenticating digital data distributed between a plurality of data segments linked to each other in accordance with a chosen chaining relationship, each data segment being associated with an authentication signature, the method comprising:

authenticating said plurality of segments in accordance with a chosen authentication algorithm, adapted to calculate a signature value for each successive segment in a chained and iterative manner and to compare the value of said signature calculated in this way with said associated signature, the next segment being authenticated in said event of a positive result on comparing said current segment and said first segment being authenticated on the basis of at least one function from an authentication library contained in non-rewritable memory, providing at least one segment forming an executable authentication plug-in previously authenticated by at least one authentication function from said authentication library and linked to said plurality of segments in accordance with said chaining relationship, and in response to a request for authentication of a plurality of segments chained in accordance with said chaining relationship in this way, wherein the chaining relationship provides an order for the authentication of said plurality of data segments, and wherein the chaining relationship is such that the signature value of a current data segment comprises an identifier of the signature value of a next data segment, authenticating each successive segment and, in the case of a segment requiring said authentication plug-in, executing said authentication plug-in in order to authenticate said segment submitted in this way to said authentication plug-in.

2. The method claimed in claim 1, wherein each segment is associated with a data table containing an associated signature, start and end addresses localizing said segment, start and end indicators localizing said associated signature, an indicator indicating that said segment is of the authentication plug-in type, and a designation identifying an authentication plug-in algorithm.

3. The method claimed in claim 1, wherein said plurality of data segments is a result of segmenting a data file.

4. The method claimed in claim 1, wherein at least one segment further contains an indicator relating to said authentication plug-in algorithm.

5. The method claimed in claim 1, wherein said chaining relationship is such that said signature of said current segment comprises said identifier of said signature of said next segment.

6. A device for authenticating digital data distributed between a plurality of digital data segments linked to each other in accordance with a chosen chaining relationship, each data segment being associated with an authentication signature, which authentication device comprises:

authentication means adapted to authenticate said plurality of segments in accordance with a chosen authentication algorithm and adapted to calculate a signature value for each successive segment in a chained and iterative manner and to compare the value of said signature calculated in this way with said associated signature, the next segment being authenticated in the event of a positive result for comparing said current segment, and said first segment being authenticated on the basis of at least one function from an authentication library contained in non-rewritable memory;

processor means adapted to provide at least one executable authentication plug-in segment stored in rewritable memory previously authenticated by at least one authentication function from said authentication library and linked to said plurality of segments in accordance with said chaining relationship, wherein the chaining relationship provides an order for the authentication of said plurality of data segments, and wherein the chaining relationship is such that the signature value of a current data segment comprises an identifier of the signature value of a next data segment; and processing means adapted in response to a request for authentication of a plurality of segments chained in accordance with said chaining relationship in this way to authenticate each successive segment and in said case of a segment requiring said authentication plug-in to execute said authentication plug-in in order to authenticate said segment submitted in this way to said authentication plug-in.

7. The device claimed in claim 6, wherein each segment is associated with a data table comprising an associated authentication signature, start and end addresses localizing said segment, start and end indicators localizing said associated signature, an indicator indicating that said segment is of said authentication plug-in type, and a designation identifying an authentication extension algorithm.

8. The device claimed in claim 6, wherein said plurality of data segments is the result of segmenting a data file.

9. The device claimed in claim 6, wherein said chaining relationship is such that said signature of said current segment contains said identifier of said signature of the next segment.

10. A computer readable storage medium comprising instructions for executing a method of authenticating digital data distributed between a plurality of data segments linked to each other in accordance with a chosen chaining relationship, each data segment being associated with an authentication signature, the method comprising:

authenticating said plurality of segments in accordance with a chosen authentication algorithm, adapted to calculate a signature value for each successive segment in a chained and iterative manner and to compare the value of said signature calculated in this way with said associated signature, the next segment being authenticated in said event of a positive result on comparing said current segment and said first segment being authenticated on the basis of at least one function from an authentication library contained in non-rewritable memory, providing at least one segment forming an executable authentication plug-in previously authenticated by at least one authentication function from said authentication library and linked to said plurality of segments in accordance with said chaining relationship, and in response to a request for authentication of a plurality of segments chained in accordance with said chaining relationship in this way, wherein the chaining relationship provides an order for the authentication of said plurality of data segments, and wherein the chaining relationship is such that the signature value of a current data segment comprises an identifier of the signature value of a next data segment, authenticating each successive segment and, in the case of a segment requiring said authentication plug-in, executing said authentication plug-in in order to authenticate said segment submitted in this way to said authentication plug-in.

* * * * *

UNITED STATES PATENT AND TRADEMARK OFFICE
CERTIFICATE OF CORRECTION

| | |
|---|---|
| PATENT NO. | : 7,353,386 B2 |
| APPLICATION NO. | : 10/875529 |
| DATED | : April 1, 2008 |
| INVENTOR(S) | : Jean-Claude Sarfati et al. |

It is certified that error appears in the above-identified patent and that said Letters Patent is hereby corrected as shown below:

On the Title Page:

On the Title Page, section (30), Foreign Application Priority Data, the application number "03291625" should be --03291625.6--.

Signed and Sealed this

Twenty-ninth Day of July, 2008

JON W. DUDAS
*Director of the United States Patent and Trademark Office*